(12) United States Patent
Bolander et al.

(10) Patent No.: US 7,210,287 B2
(45) Date of Patent: May 1, 2007

(54) ACCELERATING CATALYTIC CONVERSION

(75) Inventors: Thomas E. Bolander, Flint, MI (US);
Jeffrey J. Allen, Kelkheim-Fischbach (DE); Alexander J. Roberts, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 106 days.

(21) Appl. No.: 10/807,751

(22) Filed: Mar. 24, 2004

(65) Prior Publication Data

US 2005/0210865 A1    Sep. 29, 2005

(51) Int. Cl.
*F01N 3/00* (2006.01)
(52) U.S. Cl. .............................. 60/296; 60/274; 60/287; 60/288; 60/297; 422/170; 422/171; 422/176; 422/180
(58) Field of Classification Search ............... 60/274, 60/287, 288, 289, 291, 292, 296, 297; 422/170, 422/171, 176, 177, 178, 180
See application file for complete search history.

(56) References Cited

U.S. PATENT DOCUMENTS

| | | | | |
|---|---|---|---|---|
| 4,047,895 | A | * | 9/1977 | Urban ........................ 422/177 |
| 5,125,231 | A | * | 6/1992 | Patil et al. .................... 60/274 |
| 5,130,099 | A | * | 7/1992 | Schatz ........................ 422/175 |
| 5,768,888 | A | * | 6/1998 | Matros et al. ................. 60/274 |
| 6,148,613 | A | * | 11/2000 | Klopp et al. .................. 60/296 |
| 6,312,650 | B1 | * | 11/2001 | Frederiksen et al. ........ 422/180 |

* cited by examiner

*Primary Examiner*—Binh Q. Tran
(74) *Attorney, Agent, or Firm*—Christopher DeVries

(57) ABSTRACT

A method of reducing exhaust emission from a catalytic converter apparatus of a vehicle, the apparatus including at least one catalytic converter, each of the at least one catalytic converter having a catalyst brick positioned within a predefined length of the vehicle. The method includes directing exhaust to pass more than once through the predefined length through at least one of the at least one catalyst brick. The converter apparatus can accelerate catalyst conversion reactions and thus accelerate converter system light-off.

34 Claims, 4 Drawing Sheets

ACCELERATING CATALYTIC CONVERSION

FIELD OF THE INVENTION

The present invention relates to catalytic conversion of exhaust from fuel consumption in engines and, more particularly, to accelerating the onset of catalytic conversion.

BACKGROUND OF THE INVENTION

Gasoline-powered motor vehicles for highway use generally are equipped with catalytic converters, which treat exhaust emissions. Approximately one-third of total exhaust emissions from vehicles is produced during the first thirty seconds of operation after engine startup. As catalytic material in the catalytic converter becomes heated, conversion of exhaust gases is accelerated and the level of emissions decreases.

SUMMARY OF THE INVENTION

The present invention, in one embodiment, is directed to a method of reducing exhaust emissions from a catalytic converter apparatus of a vehicle, the apparatus including at least one catalytic converter, each having a catalyst brick positioned within a predefined length of the vehicle. The method includes directing exhaust to pass more than once through the predefined length through at least one of the at least one catalyst brick.

The invention in another embodiment is directed to a method of reducing exhaust emission from a catalytic converter apparatus including a catalytic converter having a catalyst surface area to which the exhaust is exposed while making a pass-through of the apparatus. The method includes effecting a transfer, to the catalyst surface area, of heat remaining in the exhaust after being exposed to the catalyst surface area.

In another embodiment, a catalytic converter apparatus in a motor vehicle includes at least one catalytic converter, each of the at least one catalytic converter having a catalyst brick positioned within a predefined length of the vehicle. The apparatus also includes at least one directing element that directs exhaust from the motor to pass more than once through the predefined length through at least one of the at least one catalyst brick.

In yet another embodiment, a catalytic converter apparatus includes a catalytic converter having a catalyst surface area to which exhaust is exposed while making a pass-through of the apparatus. The apparatus also includes at least one directing element that effects a transfer, to the catalyst surface area, of heat remaining in the exhaust after being exposed to the catalyst surface area.

Further areas of applicability of these and other embodiments of the present invention will become apparent from the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiment(s) of the present invention is merely exemplary in nature and is in no way intended to limit the invention, its application, or uses. Although various embodiments of the present invention are described with reference to an under-floor catalytic converter apparatus for a motor vehicle, it should be understood that the invention is not so limited. The invention can be practiced in connection with one or more converters in various locations in a vehicle, including but not limited to close-coupled converter(s), under-firewall converter(s), and rear-located converter(s). It also is contemplated that an embodiment of the present invention may be implemented in a vehicle having one or more catalytic converters in addition to such embodiment.

Figure 1:
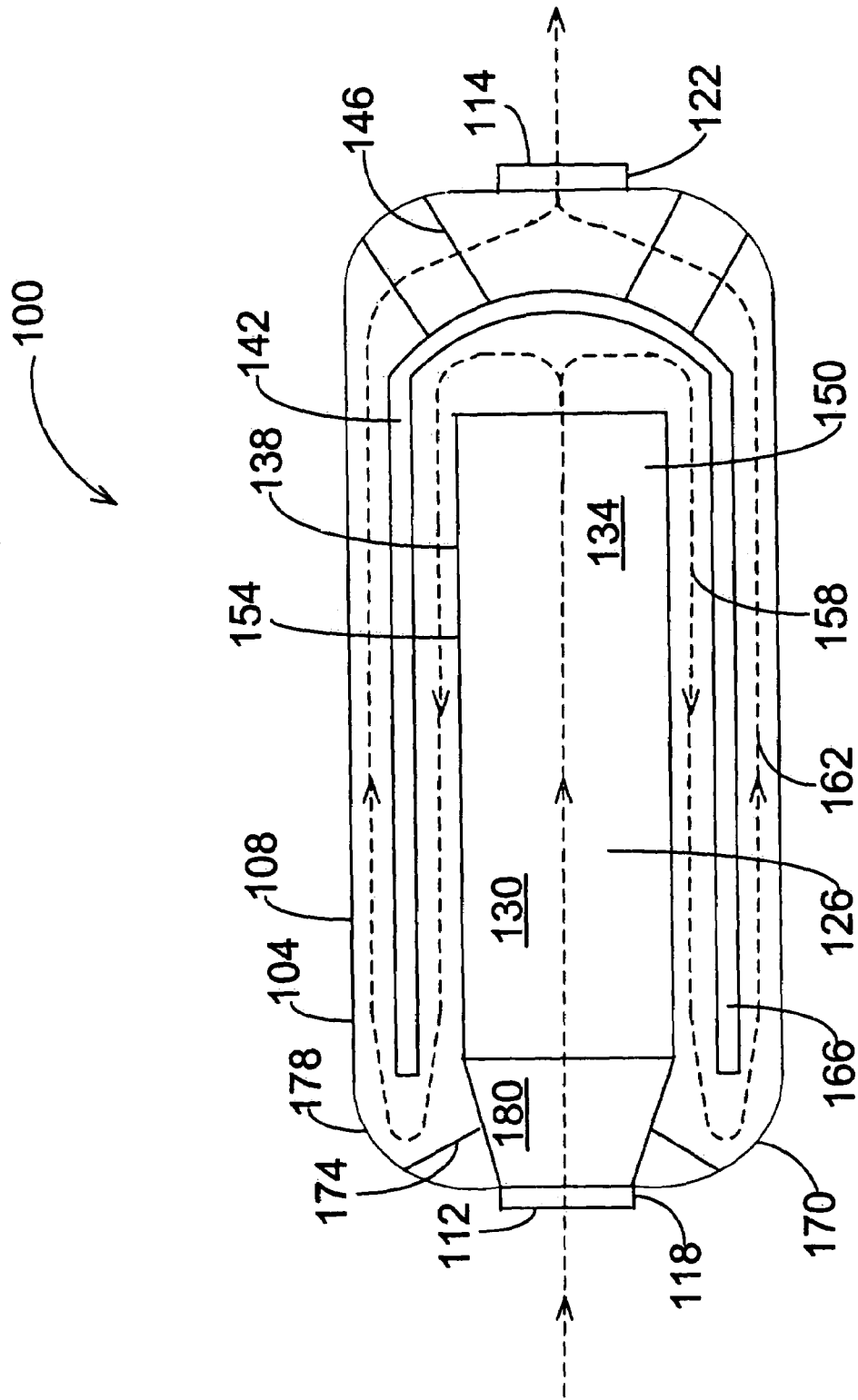
FIG. 1 is a longitudinal sectional view of a converter apparatus according to one embodiment of the present invention.

An embodiment of a catalytic converter apparatus for a motor vehicle is indicated generally by reference number 100 in FIG. 1. The apparatus 100 includes a catalytic converter 104 having an outer canister 108. The canister 108 has an inlet 112 and an outlet 114. A gas-tight seal 118 connects the canister inlet 112 with an input pipe (not shown) that carries exhaust from the vehicle engine into the converter apparatus 100. A seal 122 connects the canister outlet 114 with a pipe (not shown) that carries exhaust from the converter apparatus 100 for eventual discharge into the air.

Inside the canister 108 is a catalyst brick 126, a honeycomb-like structure having a plurality of passages and surfaces (not shown) and coated with one or more catalysts, for example, platinum and/or other such catalyst(s) which are known in the art. The catalyst brick 126 is structured, for example, for three-way conversion, i.e., for reduction of carbon monoxide, hydrocarbon, and nitrogen oxide emissions. An upstream portion 130 of the catalyst brick 126 is coated with a reduction catalyst and a downstream portion 134 of the catalyst brick 126 is coated with an oxidation catalyst, as known in the art. The catalyst brick 126 is wrapped in a metallic, e.g., stainless steel, fiber mesh 138 and is loosely (allowing movement) connected to the canister inlet 112.

A metal bowl 142 is positioned by brackets 146 over a downstream end 150 and a sidewall 154 of the catalyst brick 126. The bowl 142 surrounds the catalyst brick 126 while leaving space 158 between the catalyst brick 126 and the bowl 142, and while leaving space 162 between the bowl 142 and the canister 108. A sidewall 166 of the bowl 142 terminates relative to an end wall 170 of the canister 108 such that the spaces 158 and 162 are continuous. An optional collar 174 surrounds a neck 180 of the converter and meets the canister 108 to direct exhaust flow as further described below.

In operation, exhaust from the vehicle passes through the inlet 112, enters the catalyst brick 126 and is exposed to the catalyst(s) coating the catalyst brick 126. The exhaust stream travels generally in a downstream direction and exits the catalyst brick. The bowl 142 directs the exhaust stream to flow back outside the catalyst brick 126, in a generally upstream direction alongside the catalyst brick 126 and inside the bowl 142. Exhaust deflected upstream in the foregoing manner is again deflected, for example, by the collar 174 and/or an end wall of the canister 108. The deflected exhaust stream travels generally in the downstream direction, alongside and between the bowl 142 and canister 108. The exhaust stream then exits the canister 108 via the outlet 114.

Figure 2:
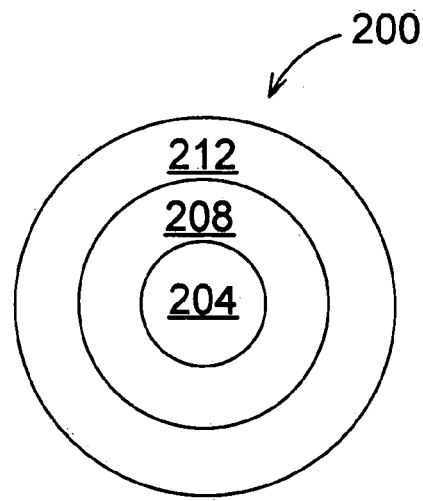
FIG. 2 is a diagram illustrating exhaust flow and temperature patterns relative to an embodiment of a converter apparatus.

FIG. 2 illustrates a flow and temperature pattern 200 of exhaust making a pass-through, for example, of the converter apparatus 100. It should be noted generally that FIG. 2 is descriptive not only of the embodiment shown in FIG. 1, but also is descriptive of other embodiments as described further below. Referring now to FIGS. 1 and 2, exhaust moving generally downstream within the catalyst brick 126 can be represented as moving within a central core 204 and is very hot compared to exhaust traveling through other portions of the converter apparatus 100. Exhaust moving generally upstream within the bowl 142 can be seen to flow in an inner ring 208 around the core 204. Exhaust traveling in the ring 208 tends to carry an appreciable amount of heat. Exhaust moving generally downstream outside the bowl 142 flows in an outer ring 212. Exhaust in the outer ring 212 is cooler than exhaust moving in the central core 204 and inner ring 208, but still tends to carry heat, at least some of which tends to be transferred to the inner ring 208 via the metal bowl 142.

The inner ring 208 and outer ring 212 tend to contribute to and conserve heat in the central core 204. It can be observed that heat carried by exhaust in the inner and outer rings 208 and 212 radiates toward the core 204, thereby accelerating catalysis occurring in the core 204.

Figure 3:
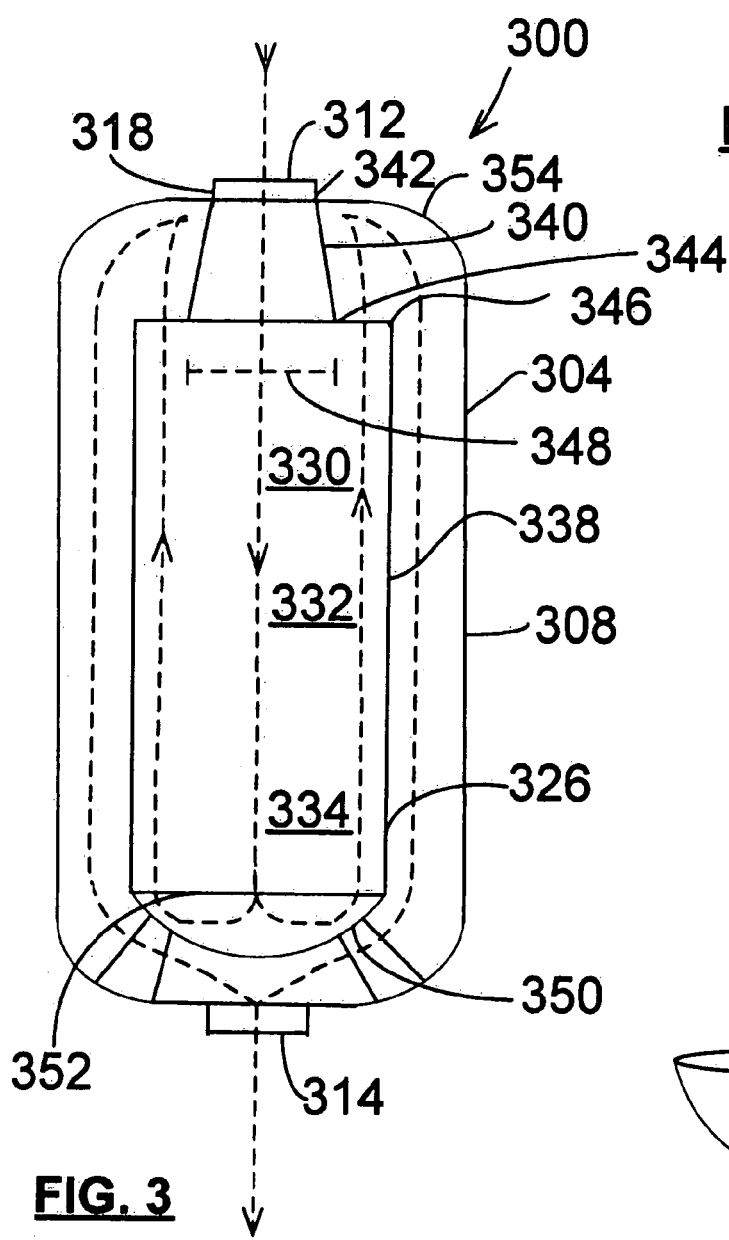
FIG. 3 is a longitudinal sectional view of a converter apparatus according to one embodiment.

Another embodiment of a converter apparatus is indicated generally by reference number 300 in FIG. 3. The apparatus 300 includes a catalytic converter 304 having an outer canister 308. The canister 308 has an inlet 312 and an outlet 314. A gas-tight seal 318 connects the canister inlet 312 with an input pipe (not shown) that carries exhaust from the vehicle engine into the converter apparatus 300. A seal 322 connects the canister outlet 314 with a pipe (not shown) that carries exhaust from the converter apparatus 300 for eventual discharge into the air.

Inside the canister 308 is a catalyst brick 326 having a plurality of passages and surfaces (not shown) coated with one or more catalysts, for example, platinum and/or other such catalyst(s). The catalyst brick 326 is structured for three-way conversion in a two-directional exhaust flow. Specifically, an upstream portion 330 of the catalyst brick is coated with a reduction catalyst, a middle portion 332 is coated with an oxidation catalyst, and a downstream portion 334 also is coated with a reduction catalyst. The catalyst brick 326 is wrapped in a metallic, e.g., stainless steel, fiber mesh 338. A hollow metal sleeve 340 having a truncated conical shape fluidly connects the canister inlet 312 with the catalyst brick 326. An upper edge 342 of the sleeve 340 is sealed to the canister 308 so that all exhaust passing through the inlet 312 goes into the catalyst brick 326. A lower edge 344 of the sleeve 340 is welded onto the wire mesh 338 across an upstream end 346 of the catalyst brick 326. The sleeve 340 directs the exhaust stream toward a cross-sectional area 348 within the catalyst brick 326. It can be seen that the size of such a cross-sectional area is determined by the size and shape of the sleeve 340, which influence exhaust stream entry into the catalyst brick 326 and thus can influence pattern(s) of exhaust flow within the catalyst brick 326.

A metal bowl 350 is welded onto the wire mesh 338 across a downstream end 352 of the catalyst brick 326. The bowl 350 covers the entire downstream end 352, although other embodiments are contemplated wherein the bowl 350 covers the downstream end 352 only partially.

In operation, exhaust from the vehicle passes through the inlet 312 and sleeve 340, enters the catalyst brick 326 and is exposed to the catalyst(s) coating the catalyst brick 326. The exhaust stream travels generally in a downstream direction toward the bowl 350. The bowl 350 directs the exhaust stream back inside the catalyst brick 326, where the exhaust stream moves generally in an upstream direction and is again exposed to the catalyst(s). Exhaust deflected upstream in the foregoing manner exits the catalyst brick 326 through the catalyst brick upstream end 346 around the lower edge 344 of the sleeve 340. The sleeve 340 and an end wall 354 of the canister 308 direct the exhaust stream generally in the downstream direction, alongside the canister 308. The exhaust then exits the canister 308 via the outlet 314.

Referring to FIGS. 2 and 3, the relatively hot central core 204 can be understood to represent exhaust moving generally downstream within the catalyst brick 326. In the present embodiment, the core 204 tends to be coextensive in cross sectional area with the cross-sectional area 348 determined, for example, by the size and shape of the sleeve 340 as described above. The inner ring 208 can be understood to represent exhaust moving generally upstream within the catalyst brick 326 and surrounding the exhaust stream represented by the central core 204. The outer ring 212 can be understood to represent exhaust moving generally downstream outside the catalyst brick 326. Exhaust in the outer ring 212 is cooler than exhaust moving in the central core 204 and ring 208, but still carries heat, at least some of which may be transferred to the inner ring 208.

It can be observed that heat carried by exhaust in the outer ring 212 and inner ring 208 radiates toward the central core 204, thereby accelerating catalysis occurring in the core 204. Heat from the outer ring 212 is transferred to the inner ring 208, thereby accelerating catalysis occurring in the inner ring 208 and central core 204. The metal sleeve 340 and bowl 350 also tend to contribute to the transfer of heat to the central core 204.

Figure 4A:
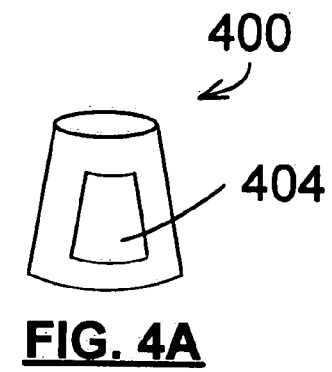
FIG. 4A is a perspective view of a sleeve of a converter apparatus according to one embodiment.
Figure 4B:
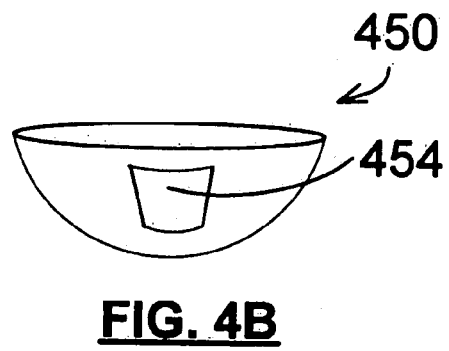
FIG. 4B is a perspective view of a bowl of a converter apparatus according to one embodiment.

Another embodiment of a sleeve is indicated generally by reference number 400 in FIG. 4A. The sleeve 400 has a spring-loaded door 404 that opens or closes in response to exhaust pressure. Thus the door 404 may open, for example, to relieve exhaust backpressure. Another embodiment of a bowl is indicated generally by reference number 450 in FIG. 4B. The bowl 450 has a spring-loaded door 454 that opens or closes in response to exhaust pressure, and thus may open to relieve backpressure from the exhaust.

Figure 5:
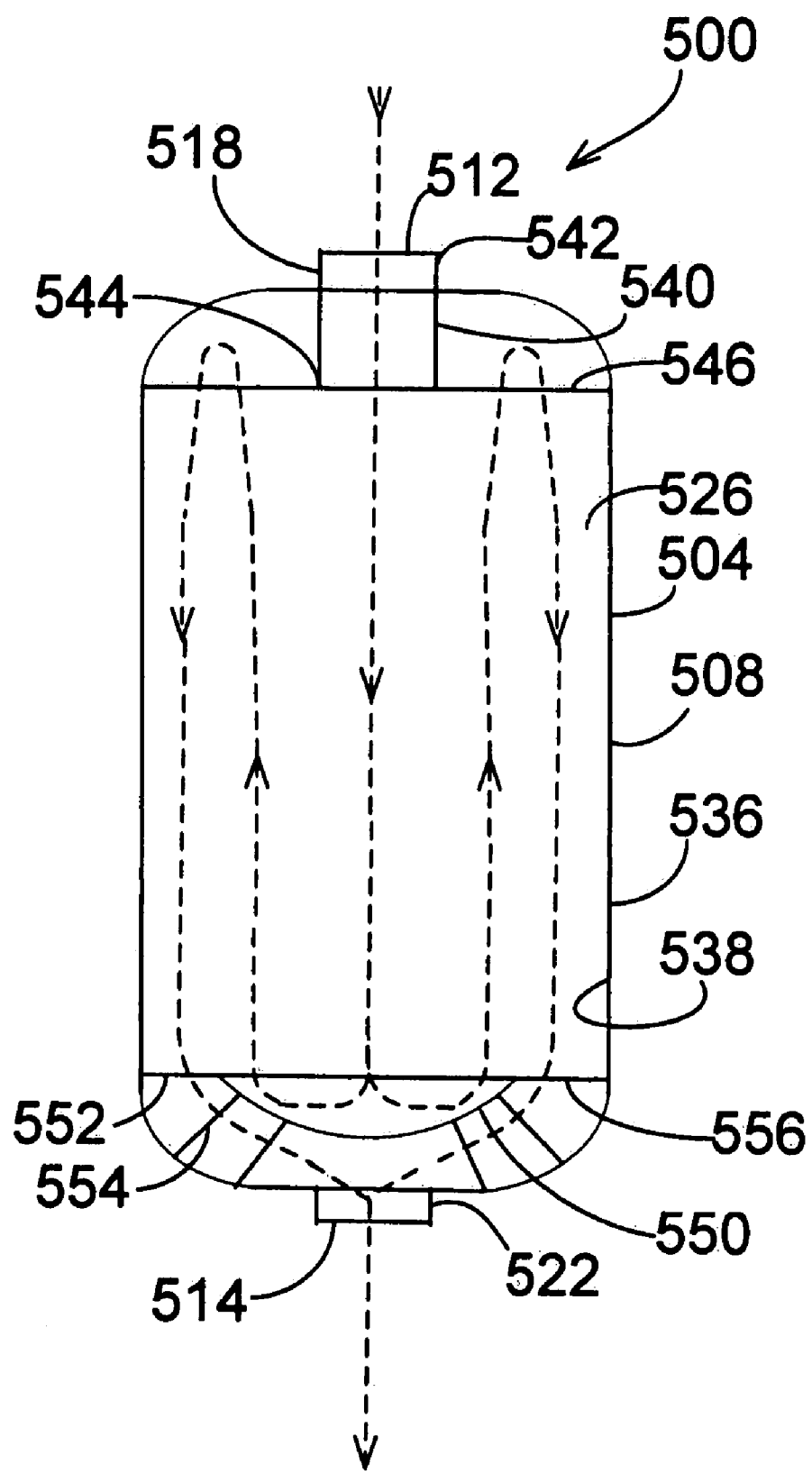
FIG. 5 is a longitudinal sectional view of a converter apparatus according to one embodiment.

Another embodiment of a converter apparatus is indicated generally by reference number 500 in FIG. 5. The apparatus 500 includes a catalytic converter 504 having an outer canister 508. The canister 508 has an inlet 512 and an outlet 514. A gas-tight seal 518 connects the canister inlet 512 with an input pipe (not shown) that carries exhaust from the vehicle engine into the converter apparatus 500. A seal 522 connects the canister outlet 514 with a pipe (not shown) that carries exhaust from the converter apparatus 500 for eventual discharge into the air.

Inside the canister 508 is a catalyst brick 526 having a plurality of passages and surfaces (not shown) coated with one or more catalysts, for example, platinum and/or other such catalyst(s). The catalyst(s) are arranged, for example, as previously described with reference to FIG. 3. The catalyst brick 526 is wrapped in a metallic, e.g., stainless steel, fiber mesh 536 and is positioned flush with or close to an inner wall 538 of the canister 508.

A hollow metal sleeve 540 having a cylindrical shape fluidly connects the canister inlet 512 with the catalyst brick 526. An upper edge 542 of the sleeve 540 is sealed to the canister 508 so that all exhaust passing through the inlet 512 goes into the catalyst brick 526. A lower edge 544 of the sleeve 540 is welded onto the wire mesh 536 across an upstream end 546 of the catalyst brick 526. The sleeve 540 directs the exhaust stream toward a cross-sectional area 548 within the catalyst brick 526. It should be noted generally that various embodiments may include sleeves having shapes and dimensions different from those exemplified herein.

A metal bowl 550 is attached to a downstream end 552 of the catalyst brick 526 by metal brackets 554, or may be welded onto the wire mesh 536 across a downstream end 556 of the catalyst brick 526. The bowl 550 partially covers the downstream end 556 of the catalyst brick. It can be appreciated that the bowl 550 may be sized and/or shaped in a plurality of ways and thereby influence the flow of exhaust as hereinafter described.

In operation, exhaust from the vehicle passes through the inlet 512 and sleeve 540, enters the catalyst brick 526 and is exposed to the catalyst(s) coating the catalyst brick 526. The exhaust travels generally in a downstream direction toward the bowl 550, which directs exhaust back inside the catalyst brick 526. The exhaust travels generally in an upstream direction and is again exposed to the catalyst(s). Exhaust deflected upstream in the foregoing manner leaves the catalyst brick 526 through the catalyst brick upstream end 546 and around the lower edge 544 of the sleeve 540. The sleeve 540 and an end wall 560 of the canister 508 direct the exhaust generally downstream inside the catalyst brick 526. The exhaust then exits the catalyst brick 526 around the bowl 550 and exits the canister 508 via the outlet 514. Thus in the present embodiment, exhaust is exposed to the catalyst(s) three times before exiting the apparatus 500.

Referring to FIGS. 2 and 5, the relatively hot central core 204 can be understood to represent exhaust moving generally downstream within the catalyst brick 526 through the cross-sectional area 548. The inner ring 208 represents exhaust moving generally upstream within the catalyst brick 526 and surrounding the exhaust stream represented by the central core 204. The outer ring 212 represents exhaust moving generally downstream within the catalyst brick 526 around the exhaust represented by the inner ring 208.

Exhaust moving in the inner ring 208 and outer ring 212 surrounding the core 204 tends to conserve heat in the core 204, thereby accelerating catalysis occurring in the core 204 and inner ring 208. The metal sleeve 540 and bowl 550 also tend to contribute to the transfer of heat to the central core 204.

Figure 6:
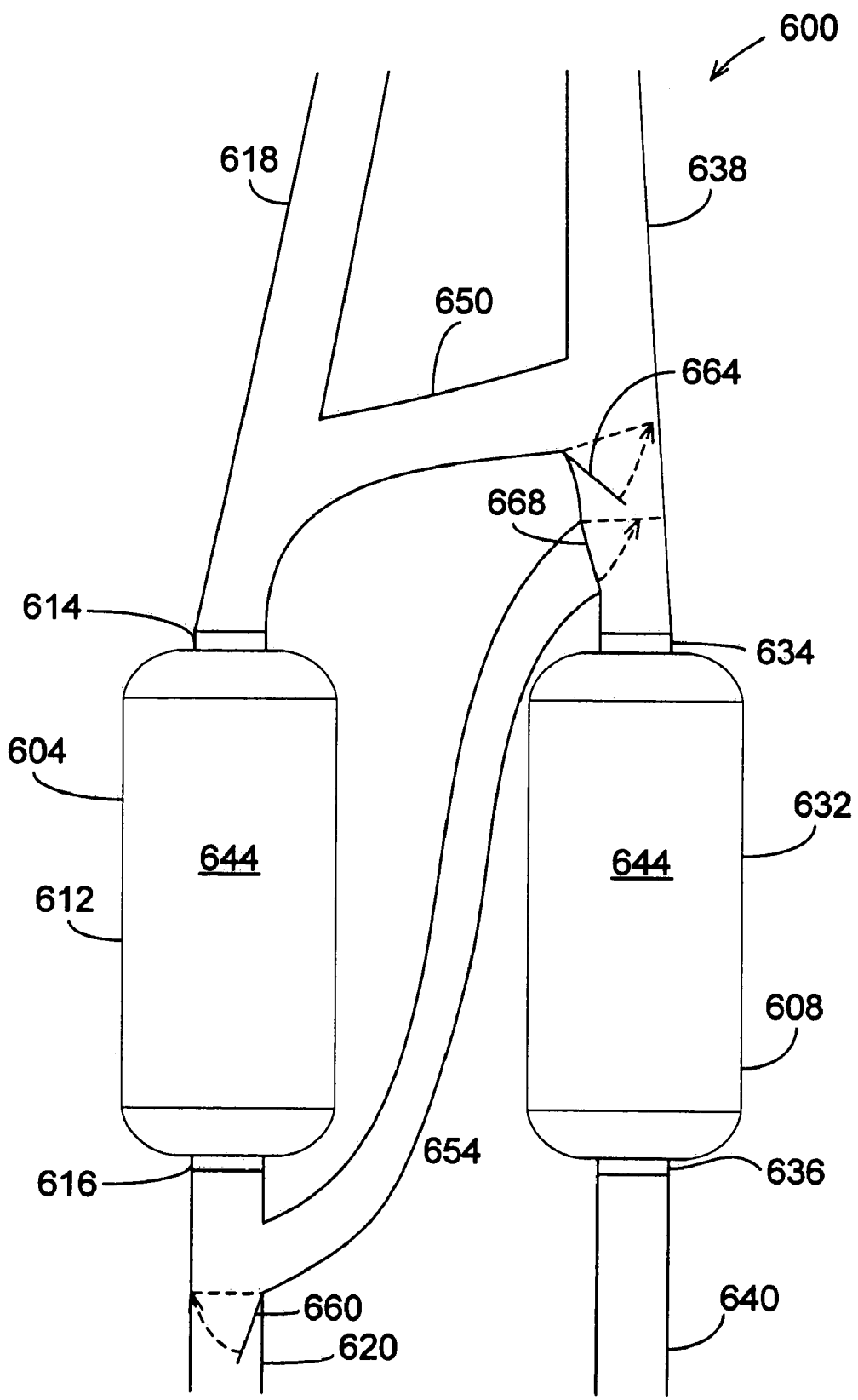
FIG. 6 is a longitudinal sectional view of a converter apparatus according to one embodiment.

Yet another embodiment of a converter apparatus is indicated generally in FIG. 6 by reference number 600. The apparatus 600 includes a plurality of, e.g., two, catalytic converters 604 and 608. The converter 604 includes an outer canister 612 having an inlet 614 and an outlet 616. An inlet pipe 618 connects the inlet 614 to a bank of cylinders (not shown) of the vehicle engine. An outlet pipe 620 carries exhaust from the canister 612 for eventual discharge into the air.

The converter 608 includes an outer canister 632 having an inlet 634 and an outlet 636. An inlet pipe 638 connects the inlet 634 to a bank of cylinders (not shown) of the vehicle engine. An outlet pipe 640 carries exhaust from the canister 632 for eventual discharge into the air. Catalyst bricks 644 inside the canisters 604 and 608 each have a plurality of passages and surfaces (not shown) coated with one or more catalysts, for example, platinum and/or other such catalyst(s), for example, as described with reference to FIG. 1.

The inlet pipes 618 and 638 are connected by an upstream bypass pipe 650. A downstream bypass pipe 654 connects the outlet pipe 620 to the inlet pipe 638 downstream of the upstream bypass pipe 650. A valve 660 in the outlet pipe 620 is positioned downstream from where the outlet pipe 620 joins the downstream bypass pipe 654. A valve 664 in the inlet pipe 638 is positioned downstream from where the inlet pipe 638 joins the upstream bypass pipe 650, and upstream from where the downstream bypass pipe 654 joins the inlet pipe 638. A valve 668 in the downstream bypass pipe 654 is positioned downstream from the valve 664. The valves 660, 664 and/or 668 may be, for example, solenoid-activated and/or vacuum-controlled valves as known in the art.

The valves 660, 664 and/or 668 are controlled, for example, by an engine controller (not shown) to switch the converters 604 and 608 between parallel operation and series operation. Specifically, for parallel operation, valves 660 and 664 are switched to an open position while valve 668 is switched shut. Exhaust then flows from the engine banks in parallel flow streams through the associated converters 604 and 608. For series operation, valves 660 and 664 are switched shut and valve 668 is switched to an open position. Exhaust flowing through the inlet pipe 638 then is directed through the upstream bypass pipe 650 and into the converter 604. The exhaust flows through the downstream bypass pipe 654, through the converter 608 and through the outlet pipe 640.

The foregoing switching assembly may be activated, for example, in response to varying engine load conditions, engine RPMs, air intake and/or other conditions relating, for example, to exhaust pressure and/or catalyst temperature. During cold start, for example, the catalyst(s) in the converters 604 and 608 tend to be cold, and exhaust pressure tends to be low compared to exhaust pressure during steady-state engine operation. Thus, in one embodiment, the valves 660, 664 and/or 668 are switched to series operation for a predetermined time, e.g., for about sixty seconds, after engine start. Exhaust flows from both engine banks associated with the converters 604 and 608 into the converter 604. It can be understood that operating the converters 604 and 608 in series allows about twice the volume of exhaust into the converter 604, at about twice the rate of speed, as would be the case during parallel operation of the converters 604 and 608. It also can be appreciated that heat from the exhaust causes the catalyst(s) in the converter 604 to become heated more quickly than would be the case during parallel operation of the converters 604 and 608.

When, for example, the engine has warmed up, the catalyst(s) are relatively hotter and engine exhaust pressure is higher than during cold start. The converters 604 and 608 then may be switched via the switching assembly to parallel operation as previously described.

The converter apparatus 100, 300, 500 and 600 each can be seen to exemplify a method of reducing exhaust emission from a catalytic converter apparatus of a vehicle. Each catalytic converter of the foregoing converter apparatus has a catalyst brick positioned within a predefined length of the vehicle. Such method includes directing exhaust to pass more than once through the predefined length through at least one of the catalyst brick(s).

The above-described converter apparatus can accelerate the rate of gas particle conversion reactions, thus resulting in very quick converter system light-off. Because gases are exposed to the surface area of catalyst material for longer periods of time than in converters of the prior art, heat transfer to the catalyst material is increased. Such heat previously would have been lost through a vehicle tailpipe.

Where an embodiment of the above converter apparatus is used as an under-floor converter, a need for one or two close-coupled converters can be eliminated. Thus backflow pressure is reduced, and the cost of precious metals used in such converters can be saved. Simple modifications can be made to many existing catalytic converters to provide embodiments of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of reducing exhaust emission from a catalytic converter apparatus of a vehicle comprising:
   including at least one catalytic converter having a catalyst brick positioned within a predefined length of the vehicles; and
   directing exhaust in upstream and downstream directions to pass more than once through the predefined length through the catalyst brick,
   wherein the exhaust enters the catalytic converter at a first end of a symmetrical axis of the catalytic converter and exits the catalytic converter at a second end opposite the first end.

2. The method of claim 1 performed at least while the exhaust has a low exhaust pressure.

3. The method of claim 1 wherein the at least one catalyst brick includes at least one catalyst, said method further comprising effecting a transfer, to the at least one catalyst, of heat remaining in exhaust that has passed at least once through the predefined length.

4. The method of claim 3 wherein effecting a transfer of heat comprises directing exhaust to flow between the catalyst brick and a canister wall of said at least one catalytic converter.

5. The method of claim 1 wherein directing exhaust to pass more than once through the predefined length comprises directing exhaust to pass at least twice through said at least one catalyst brick.

6. The method of claim 5 wherein directing exhaust to pass at least twice through said at least one catalyst brick comprises directing exhaust to pass at least twice through the same catalyst brick.

7. The method of claim 1 wherein the catalytic converter apparatus includes a plurality of catalytic converters connected in parallel to receive the exhaust, said method further comprising directing the exhaust through a series connection of the converters for a predetermined time period after starting the vehicle.

8. The method of claim 7 further comprising closing said series connection and opening said parallel connection after said time period.

9. A method of reducing exhaust emission from a catalytic converter apparatus comprising:
   exposing the exhaust to a catalytic surface area of a catalytic converter while making a pass-through of the apparatus; and
   effecting a transfer to a central core of said catalyst surface area and of said converter of heat remaining in the exhaust after being exposed to said central core,
   wherein at least one directing element of said catalytic converter directs the exhaust to pass across said catalytic surface area more than once during said pass-through of the apparatus.

10. The method of claim 9 further comprising:
    limiting said catalyst surface area to less than a total surface area to which the exhaust is exposed during the pass-through of the apparatus; and
    effecting a transfer of heat from the total surface area to the limited catalyst surface area.

11. The method of claim 10 wherein effecting a transfer of heat from the total surface area comprises effecting a transfer of heat from at least one of a canister wall and a ring of catalytic surface area surrounding the limited catalytic surface area of said catalytic converter.

12. The method of claim 9 wherein effecting a transfer of heat is performed while the exhaust completes the pass-through.

13. The method of claim 9 performed at least while the exhaust has a low exhaust pressure.

14. A catalytic converter apparatus in a motor vehicle, said apparatus comprising:
    a catalytic converter having a catalyst brick positioned within a predefined length of the vehicle; and
    at least one directing element that directs exhaust from the motor in upstream and downstream directions to pass more than once through the predefined length through the catalyst brick,
    wherein the exhaust enters the catalytic converter at a first end of a symmetrical axis of the catalytic converter and exits the catalytic converter at a second end opposite the first end.

15. The converter apparatus of claim 14 wherein said at least one directing element effects a transfer of heat from the exhaust to one of said at least one converter.

16. The converter apparatus of claim 14 wherein said at least one catalyst brick comprises at least one cross-sectional area, said at least one directing element comprising a sleeve forming an inlet to said catalyst brick and that directs the exhaust toward at least a portion of said at least one cross-sectional area.

17. The converter apparatus of claim 16 wherein said sleeve comprises a door that opens or closes in response to a pressure of the exhaust.

18. The converter apparatus of claim 16 wherein said sleeve comprises at least one of a cylindrical shape and a truncated conical shape.

19. The converter apparatus of claim 14 wherein said at least one directing element comprises a bowl mounted at least partly over an outlet of said catalyst brick.

20. The converter apparatus of claim 19 wherein said at least one catalyst brick comprises at least one cross-sectional area and said bowl directs the exhaust toward at least a portion of said at least one cross-sectional area.

21. The converter apparatus of claim 19 wherein said bowl directs the exhaust to flow alongside said catalyst brick.

22. The converter apparatus of claim 19 wherein said bowl comprises a door that opens or closes in response to a pressure of the exhaust.

23. The converter apparatus of claim 14 further comprising at least one canister in which said at least one catalyst brick is mounted, said at least one directing element comprising at least one end wall of said canister.

24. The converter apparatus of claim 14 wherein said at least one catalytic converter comprises a plurality of converters connected in parallel, said at least one directing element comprising a switching assembly that alternates connection of said converters between said parallel connection and a series connection of said converters.

25. A catalytic converter apparatus comprising:
a catalytic converter having a catalyst surface area to which exhaust is exposed while making a pass-through of said apparatus; and
at least one directing element that effects a transfer, to a central core of said catalyst surface area and of said converter, of heat remaining in the exhaust after being exposed to said central core,
wherein the at least one directing element of the catalytic converter directs the exhaust to pass across the catalytic surface area more than once during the pass-through of the apparatus.

26. The converter apparatus of claim 25 wherein said catalyst surface area is comprised by a catalyst brick and said at least one directing element directs the exhaust to flow within said converter apparatus a distance in addition to a length of said catalyst brick.

27. The converter apparatus of claim 25 wherein said at least one converter comprises a catalyst brick, said at least one directing element comprising a sleeve forming an inlet to said catalyst brick and that directs the exhaust toward at least a portion of a cross-sectional area of said catalyst brick.

28. The converter apparatus of claim 27 wherein said sleeve comprises at least one of a cylindrical shape and a truncated conical shape.

29. The converter apparatus of claim 27 wherein said sleeve comprises a door that opens or closes in response to a pressure of the exhaust.

30. The converter apparatus of claim 25 wherein said at least one converter comprises a catalyst brick, said at least one directing element comprising a bowl mounted at least partly over an outlet of said catalyst brick.

31. The converter apparatus of claim 30 wherein said bowl directs the exhaust toward at least a portion of a cross-sectional area of said catalyst brick.

32. The converter apparatus of claim 30 wherein said bowl directs the exhaust to flow alongside said catalyst brick.

33. The converter apparatus of claim 30 wherein said bowl comprises a door that opens or closes in response to a pressure of the exhaust.

34. The converter apparatus of claim 25 wherein said at least one converter comprises a catalyst brick mounted in a canister, said at least one directing element comprising at least one end wall of said canister.

* * * * *